Patented Mar. 8, 1938

2,110,170

UNITED STATES PATENT OFFICE 2,110,170

METHOD OF CONTROLLING CONSISTENCY OF DRY FRUIT

Earl N. Percy, Oakland, Calif., assignor to Dry Fruit Products Company, Oakland, Calif., a corporation of California No Drawing. Application December 26, 1935, Serial No. 56,261

5 Claims. (Cl. 99—204)

The invention relates to drying or dehydrating fruit or other food products, and more particularly to such processes as those disclosed in the patents to Charles C. Moore, Nos. 1,543,948 and 2,023,536 issued June 30, 1925 and December 10, 1935, respectively.

As disclosed in the Moore patents referred to, it is possible by treating ordinary commercially dried fruit, under proper conditions of temperature and pressure, to reduce the fruit to its essential fruit fibre, tissues, mineral matter and fruit sugar, or fructose, without causing any substantial decomposition of the fruit sugar. The process briefly involves the grinding of the fruit into finely comminuted particles, forming the mass obtained thereby into relatively thin wafers or cakes, and then drying the cakes in an atmosphere of reduced pressure so as to lower the boiling or vapor point of the moisture in the cake to a temperature where the fruit may be safely dehydrated without causing a chemical change or decomposition of the fruit sugar. When the fruit is properly dried by this method, a hard, crunchy, crystalline structure may be produced which is a most tasty and delicate food substance and which may be consumed in wafer, cake or in ground form. With the methods heretofore used, however, it has not always been possible to obtain a uniform quality or consistency of the dehydrated product. Where the moisture content in the original commercially dried fruit was relatively high, and the drying process thereby prolonged, the product instead of being hard and crunchy tended more towards a soft, chalk-like pulverulent structure. Likewise other differences in the quality of the fruit would directly affect the quality and consistency of the dehydrated product. In accordance with the present invention, and as a principal object thereof, I have developed a process for controlling the density or hardness of the finished product and am thereby able to produce a hard, crunchy, crystalline substance or a lighter, fluffier product at will, and am thereby able to absolutely insure a uniform predetermined consistency of the final product.

Another object of the invention is to provide a process of the character described by which the drying or dehydration of the fruit may be effected within a shorter period of time.

The invention possesses other objects which with the foregoing will be set forth in the following description of the preferred forms of the invention. It is to be understood, however, that I do not limit myself to said description, as I may adopt variations from said forms within the scope of the invention as set forth in the claims.

Briefly stated, I have found that the hardness or density of the dehydrated product varies considerably with the pressure to which the fruit is subjected during the drying process. As before indicated, however, there are certain limits of pressure variation which must be observed, based upon the boiling or vapor point temperature of the moisture in the fruit so as to prevent the fruit sugars from being overheated and decomposed. During the early part of the drying process, while there is a relatively high moisture content in the fruit, the temperature of the fruit is maintained low by the absorption of latent heat of vaporization, but during the later drying period, with the moisture greatly reduced, any increase of heat application to the fruit must be carefully watched to prevent overheating of the fruit sugars.

As before mentioned, the fruit is first ground into fine particles and spread into shallow sheets or cake or wafer form, the depth of these cakes being roughly from one-quarter to three-eighths of an inch. After the cake has been placed in the drying chamber, and the pressure in the chamber reduced and heat applied, the cake starts to puff and if left to do so will generally increase its depth from one to two or three times, or even greater. In accordance with the present process, the cake is watched through transparent windows and as the cake rises to about twice its initial depth, which will generally take place from ten to fifteen minutes after the cake has been placed in the chamber, a valve leading to the atmosphere is opened permitting a rather rapid inrush of air which compresses the cake to its initial size. The inrush of air may extend over two to three minutes and the pressure in the chamber is thereby brought up to between approximately five pounds per square inch absolute to atmospheric pressure, depending upon the particular type of fruit being dehydrated. After the cake has been so depressed, the valve to the atmosphere is closed and the low pressure condition again restored, this latter operation by the use of a vacuum pump. The withdrawal of the air in the restoration of the low pressure condition is somewhat slower, extending from about three to five minutes or in some cases up to as much as a half hour, than the increase of pressure during the first part of the cycle and causes a new puffing of the cake which, due to the slower withdrawal of the air, will be less than the amount of depression of the cake. The new puffing of the fruit is also somewhat retarded by reason of the withdrawal of moisture from the cake during the depressing operation of the cycle and which loss of moisture tends to set the cake and lower its elasticity.

After the cake has again increased to about double its size, the atmospheric valve is again opened and the cycle repeated. On each recurring cycle, however, the puffing becomes less and less until finally, shortly prior to a complete dehydration of the fruit, the cake sets and fails to react in any substantial degree to further variation in pressure and is maintained at a constant low pressure until the end of the drying period.

The introduction of air to the drying chamber and the resultant increase of pressure materially accelerates dehydration, making possible the reduction of the drying process in some cases to about two hours where formerly the process had to be extended for nearly double, and even greater, this time. Also since the density and hardness of the cake is a function of its size, and as the latter may be precisely controlled by the present process, a uniform high quality product is insured. Also the recurrent swelling and compressing of the cake appears to have a desirable effect on its consistency.

While I have disclosed the introduction of air to the chamber for obtaining the cyclic increases of pressure, it will be clear that other gases or fluids may be used, such as nitrogen, carbon dioxide and the like.

I claim:

1. The method of increasing the hardness of dehydrated fruit which consists in drying the fruit under conditions of heat and low pressure to reduce the fruit to substantially an anhydrous crystalline form, and momentarily increasing the pressure at several times during the drying process.

2. The method of controlling the consistency of fruit dehydrated in the presence of heat and reduced pressure to a substantially completely dry state by a cyclic variation of said pressure.

3. The method of dehydrating food which consists in subjecting the food to heat, and a recurrent variation in pressure with the maximum pressure limiting the boiling point of the moisture in the food to below the decomposition temperature of the food sugar.

4. The method of dehydrating fruit which consists in subjecting the fruit to heat, and reduced pressure, and momentarily increasing and decreasing said pressure, the increase of pressure being effected at a faster rate than the subsequent corresponding decrease in pressure.

5. The method of dehydrating fruit which consists in subjecting the fruit to heat and a cyclic variation in pressure, the pressure increase portion of each cycle being of a shorter duration than the pressure decrease portion.

EARL N. PERCY.